United States Patent [19]
Beetz et al.

[11] Patent Number: 5,526,570
[45] Date of Patent: Jun. 18, 1996

[54] HAND ACTUATED SCISSORS FOR CUTTING CABLES, PROFILES, BRANCHES OR THE LIKE

[75] Inventors: Horst Beetz, Stadtallendorf; Kurt Battenfeld, Ebsdorfergrund, both of Germany

[73] Assignee: WEZAG GmbH Werkzeugfabrik, Stadtallendorf, Germany

[21] Appl. No.: 190,657

[22] Filed: Feb. 2, 1994

[30] Foreign Application Priority Data

Apr. 2, 1993 [DE] Germany ............. 43 03 180.3

[51] Int. Cl.⁶ ........................................ B26B 13/00
[52] U.S. Cl. ........................................ 30/250; 30/253
[58] Field of Search ..................... 30/92, 188, 192, 30/250, 251, 253, 254

[56] References Cited

U.S. PATENT DOCUMENTS

| | | | |
|---|---|---|---|
| 4,223,439 | 9/1980 | Rommel | 30/250 |
| 4,644,650 | 2/1987 | Laux et al. | 30/250 |
| 5,184,404 | 2/1993 | Chen | 30/250 |
| 5,218,768 | 6/1993 | Putsch et al. | 30/250 |
| 5,231,763 | 8/1993 | Laux | 30/250 |

FOREIGN PATENT DOCUMENTS

| | | |
|---|---|---|
| 2832561 | 1/1981 | Germany. |
| 9010931.7 | 1/1992 | Germany. |

*Primary Examiner*—Eugenia Jones
*Attorney, Agent, or Firm*—Hopkins & Thomas

[57] ABSTRACT

A hand actuated scissors for cutting work pieces such as cables, profiles, branches or the like, having two hand levers (1, 2) coupled to each other, the first of which merges into a fixed cutting jaw (6) having a movable cutting jaw (10) pivotally supported at its free end that can be placed around the work piece (12) and where the cutting jaw has an outer toothing (13). A knee lever drive (3, 5, 14, 16) for swinging the movable cutting jaw (10) relative to the fixed cutting jaw (6) is provided, which includes a thrust lever (14) pivotally supported on the second hand lever (2). A notch lever (17) is pivotally supported on the first hand lever (1), where the teeth (16, 19) provided on the thrust lever (14) and the notch lever (17) respectively alternately mesh with the outer toothing (13) of the movable cutting jaw (10). The outer toothing (13) of the movable cutting jaw (10) has a pitch of less than 2.3°. The thrust lever (14) has such a length and relative positioning of its drag bearing (15) with respect to the drag bearing (3) of the hand levers (1, 2) that an initial knee lever angle (25) of no less than 90° is attained in the opened position of the hand levers.

17 Claims, 6 Drawing Sheets

HAND ACTUATED SCISSORS FOR CUTTING CABLES, PROFILES, BRANCHES OR THE LIKE

FIELD OF THE INVENTION

The invention relates to hand actuated scissors for cutting work pieces such as cables, profiles, branches or the like, having two hand levers coupled to each other, the first of which merges into a fixed cutting jaw, at the free end of which a movable cutting jaw is pivotably born that can be put around the work piece, the cutting saw having an outer toothing, a knee lever drive for swinging the movable cutting jaw relative to the fixed cutting jaw, a thrust lever born on the second hand lever, and with a notch lever at the first hand lever, where the teeth provided on the thrust lever and the notch lever alternately mesh with the outer toothing of the movable cutting jaw. Such hand actuated scissors are also known as cable cutters.

BACKGROUND OF THE INVENTION

Scissors of the type described above are known from U.S. Pat. No. 4,223,439 to Rommel. The outer toothing of the movable cutting jaw has a relatively large pitch in the order of about 3°. The spring loaded notch lever is provided with a single tooth which meshes with the outer toothing of the movable jaw, the tooth being arranged relatively close to the drag bearing of the notch lever. The thrust lever, which is also pressed against the outer toothing of the movable cutting jaw by a separate spring, has on its free end two teeth, which are arranged at a distance corresponding to the pitch. From the arrangement of the bearing between the two hand levers, the drag bearing of the thrust lever at the other hand lever, and the location of the meshing spot of the teeth of the thrust lever an initial knee lever angle in the order of 77° results. This acute angle corresponds to the maximum opening position of the two hand levers. During the pressing together of the two hand levers towards each other the knee lever angle is continuously enlarged, where it has at first to be enlarged to a knee lever angle of approximately 90° without any knee lever action. This happens under an unfavorable translation ratio. Compounding this is the fact that at a large opening angle between the two hand levers it is difficult and cumbersome to provide by hand the necessary force for moving the cutting jaws through the work piece. With work pieces of a corresponding diameter and/or of a material that is difficult to cut, the user of the scissors is forced to actuate the hand levers with both hands. This is not user friendly. In the second part of a single work step, in which the two hand levers are swung towards each other, not only the knee lever action is brought into effect, but the two hand levers are closer together anyway, so that they are more easily acted upon corresponding to the anatomic condition of the fingers on the hand. A final knee lever angle of approximately 115° is attained, at which the knee lever drive provides a maximum translation.

With the known scissors a relatively large surplus travel is necessary. This surplus travel is understood to be the distance by which the movable cutting jaw has to be additionally swung towards the closing direction so that the tooth of the notch lever can mesh with the next tooth of the outer toothing of the movable cutting jaw. Due to the small radial distance between the drag bearing of the notch lever and the tooth of the notch lever this surplus travel is relatively large. It is furthermore disadvantageous that the thrust lever does not act purely tangentially but more radially on the outer toothing around the drag bearing of the movable cutting jaw, by which the corresponding leverage is reduced. The known scissors have disadvantages in their use that result from the interaction of the pitch of the outer toothing and the forming and geometric arrangement of the individual parts of the scissors.

On a further known cable cutter, which is constructed similarly, an outer toothing on the movable cutting jaw with a pitch of approximately 2.6° is applied. The geometric arrangement is so that the notch lever, during the full travel of the hand levers towards each other, jumps over two teeth of the outer toothing, so that there is the advantageous possibility to swing the hand levers towards each other only for part of the swinging range, corresponding to the tooth of the notch lever jumping over just one tooth of the other toothing. A disadvantage is that the opening movement of the two hand levers towards each other is not limited, so that the user of such a cable cutter, if he wants to make use of the given advantage, has to stop the opening movement of the hand levers in time and reverse the direction of action of his manual force in order to make use of the advantageous travel. Whenever he does not carry out this manual limitation of the opening movement, the following actuation travel has to begin at a very large opening angle between the two hand levers, which here, too, is possible only by using both hands if the work piece is correspondingly shaped and fashioned.

From Putsch et. al., U.S. Pat. No. 5,218,768, a ratchet cutter is known, in which the drag bearing of the travel lever is disadvantageously removed from the outer toothing of the movable cutting jaw during the closing movement of the hand levers, so that the direction of the acting force becomes more unfavorable in the course of the closing movement. In the opened position the two hand levers enclose an angle that is so large that they can practically be taken only with two hands. In spite of a pitch of approximately 2.5° on the outer toothing of the movable cutting jaw, a one-handed operation is not possible.

SUMMARY OF THE INVENTION

It is the object of the invention to provide hand actuated scissors of the type described above which make a truly one-handed operation possible, in order to be able to cut comparative work pieces, which so far has only been possible through a two-handed operation and a relatively large effort in strength.

According to the invention this is realized by the scissors of the type described above in that the outer toothing of the movable cutting jaw has a pitch of less than 2.3°, and the thrust lever has such a length and relative arrangement of its drag bearing with respect to the drag bearing of the hand levers, so that an initial knee lever angle of at least 90° is attained in the opened position of the hand levers.

For one-handed operation it is important that the outer toothing has a smaller pitch than typical. With this comparatively small pitch the basis is created for the distance that the hand levers travel during one cutting action also being small. At this distance, which is necessary to swing on the movable cutting jaw by more than one tooth, the starting point of this distance may be positioned so that the hand levers are already well accessible by the fingers of one hand in the opened position. The fingers of the hand do not have to be spread to their maximum in order to be able to grab the hand levers at all, but the hand levers of the scissors already fit the hand at the beginning of a work step sot hat a manual force as high as possible can be transferred. On the other hand the pitch cannot be made arbitrarily small, since the size of the teeth also decreases with a decreasing pitch, and problems may arise to provide sufficient areas for the transfer of the considerable forces. The direction of development towards a pitch smaller than 2.3°, which is taken by the present invention, by itself is not enough. Additionally, the thrust lever has to be formed in a special way, in order to be able to make use of a knee lever effect and the translation provided therewith from the start, immediately after departing from the opened position of the hand levers. During this the very beginning of a work step when squeezing the hand levers is of a relatively subordinate importance, since each notch position can be attained only when the tooth of the notch lever meshes with the outer toothing. A certain backwards swinging of the movable cutting jaw, for which the respective cutting work at the end of the previous step has already been done so that this cutting work need not be done at the very beginning of each additional work step. As soon as this initial region has been passed, though, the required force rises considerably, and it is important that the knee lever drive is in such a position, the knee lever angle being greater than 90°, so that a considerable knee lever effect can be exploited. So far initial knee lever angles in the order of 77° have been employed, so that, at the moment of the greatest demand of force, knee lever angles in the order of 90° were available so that just at this decisive moment no knee lever effect could be exploited. If one starts with an initial knee lever angle in the order of 90°, though, then a knee lever angle of about 100° results at the moment of the maximum demand of force. Additionally there is a change in the force effect direction of the force transferred by the thrust lever to the outer toothing of the movable cutting jaw in the scissors of this invention. Beginning a work step of the hand levers with an initial knee lever angle in the order of 77°, as in the state of the art, the angle of the force effect direction to the tangent to the outer toothing increases, until a knee lever angle of 90° is attained. Only afterwards does this tendency reverse, and smaller force effect angles result at knee lever angles greater than 90°. A large force effect angle is synonymous with a reduced lever arm of the transferred force about the bearing of the movable cutting jaw, though. With the scissors of this invention the force effect angle continuously decreases during one work step of pressing together the hand levers, and therefore becomes smaller and increasingly approaches the tangential direction to the outer toothing of the movable cutting jaw, so that the respective lever arm becomes increasingly larger.

The thrust lever is also formed to be longer than the thrust lever of the state of the art. In connection with the other geometric conditions of its arrangement, this promotes the described advantageous action.

It is simply astonishing how the force having to be applied by the hand with the formation of the scissors according to this invention is converted. When cutting the same work piece with scissors according to the state of the art this is difficult and only possible at all by using both hands. With the new scissors a true one-handed operation is possible, the maximum forces having to be applied by the hand are smaller. The cutting work for cutting the work piece, which cannot be reduced, is distributed differently on the individual work steps compared to the state of the art, whereby naturally more work steps have to be carried out due to the smaller pitch. This is in no way experienced as a disadvantage, though.

The thrust lever may have such a length and relative arrangement of its drag bearing to the drag bearing of the hand levers, so that a final knee lever angle in the order of 120° is attained in the closed position of the hand levers. While so far final knee lever angles in the order of 115° could be attained, the present invention uses the knee lever effect to a greater degree, and it does so at the end of a work step, where the hand levers are already relatively close together and the force that can be applied by the fingers of the hand is decreasing again. This disadvantage due to the anatomic conditions is therefore favorably compensated by the large knee lever effect.

The thrust lever may have such a length and relative arrangement that it has an initial force effect angle of less than 6° in the opened position of the hand levers. While so far initial force effect angles in the order of 10° to 12° were used, a smaller initial force effect angle is now applied so that the force acting direction of the initial force, which is transferred by the thrust lever to the outer toothing of the movable cutting jaw, is now directed more tangentially and therefore uses a longer lever arm about the bearing of the movable cutting jaw. When already starting at an initial force effect angle smaller than 6° and using the knee lever effect, a continuously smaller force effect angle results in the course of one work step down to a final force effect angle in the order of 1° to 2°, whereas the state of the art made use of final force effect angles in the order of 4° to 5°.

The thrust lever should have at least three, and preferably four, teeth which are fashioned as a roll-off toothing. With the reduction of the pitch and therefore also of the size of the teeth on the outer toothing, there is necessarily also a reduction in size of the teeth on the thrust lever. Such a reduction in size is limited insofar as sufficient areas for the transfer of the forces have to be provided. With the formation of the roll-off toothing according to the invention, it is ensured that at each instance at least two teeth of the thrust lever mesh with two teeth of the outer toothing in a force transferring way.

The notch lever can have at least two teeth and is arranged in a way so that it acts in a direction as tangential as possible on the outer toothing of the movable cutting jaw. Since the notch lever has to bear the resilient force of the work piece with each opening movement of the hand levers, it is sensible in this case, too, to increase the number of teeth, in order to be able to distribute and take up the load. The notch lever is longer compared to the state of the art, with the two teeth also being arranged comparatively further away from the drag bearing of the notch lever. This makes a nearly radial swinging of the teeth of the notch lever towards the drag bearing of the movable cutting jaw possible. This keeps the surplus travel at the end of a work step favorably small.

The opening angle of the hand levers may be limited by stops to approximately 20° in the opened position. In the state of the art the opening angle was limited to 30° and more. With scissors of the known size, for which the distance from the force exerted by the hand on the hand levers to the drag bearing of the hand levers is approximately 150 mm, the hand levers here can be taken relatively comfortably by the fingers of one hand, but yet be positioned so that the maximum hand force can be exerted. The fingers of the hand therefore must not be spread to the limit in order to hold the hand levers at all.

The outer toothing on the movable cutting jaw, the teeth on the thrust lever, and the teeth on the notch lever may be formed as triangular toothing, with the triangle arranged in the only sensible direction. This results in a small surplus travel.

In a special embodiment the initial knee lever angle may be approximately 94°, so that considerable knee lever effects in the course of a work step are attained and exploited.

The thrust lever and/or the notch lever may be lifted off the outer toothing of the movable cutting jaw against the pressure of a spring. In order to be able to abort an already started cutting process it is understood that both levers have to be lifted off to achieve this. A mutual actuation of the thrust lever and the notch lever is therefore sensible.

The teeth of the thrust lever may be arranged on a separate tooth segment piece that is born pivotably on the free end of the thrust lever. Then a full contact area of the teeth of the thrust lever with the outer toothing can be achieved in each work step, as it is sensible for the transfer of the force.

BRIEF DESCRIPTION OF THE DRAWINGS

A preferred embodiment of the scissors according to the invention herein is illustrated in the following Figures. The Figures show in.

DETAILED DESCRIPTION

Figure 1:
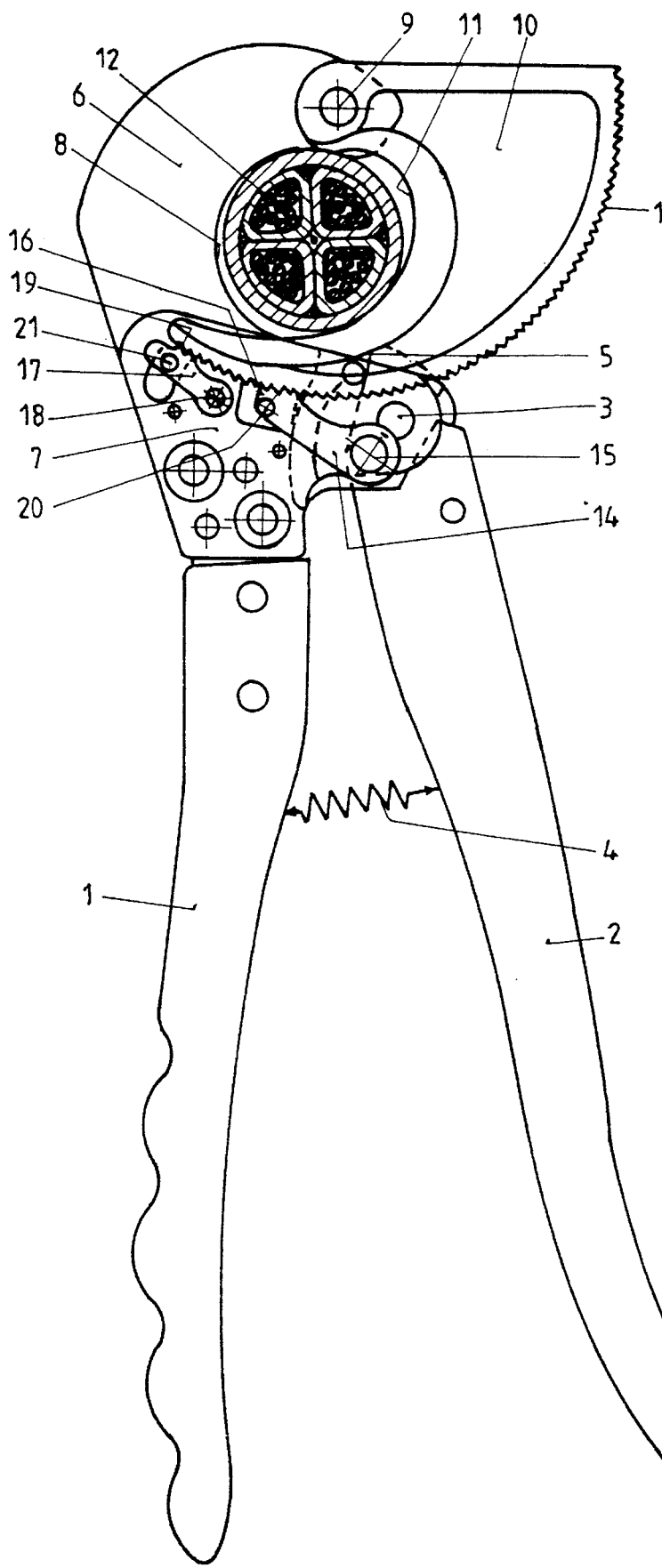
FIG. 1 a side view of the scissors in the opened position.

The scissors shown in FIG. 1 have a first or fixed hand lever 1 and a second hand lever 2 movable with respect to the former. The hand lever 2 is born on the hand lever 1 in a drag bearing 3 in a limited pivoting way. An opening spring 4, shown only schematically between the two hand levers 1 and 2, keeps the hand levers 1 and 2 in the opened position as shown in FIG. 1, where this maximum opening is limited by stops 5 between the hand levers 1 and 2.

The fixed hand lever 1 merges into a fixed cutting jaw 6. A bearing plate 7 is also solidly connected to the hand lever 1. The bearing plate 7 holds the drag bearing 3 between the hand levers 1 and 2. The cutting jaw 6 has on its inner perimeter a cutting edge 8, which has a circular shape and is sharpened accordingly. At the free end of the cutting jaw 6 a movable cutting jaw 10 is pivotally supported, free to pivot in a drag bearing 9, the movable cutting jaw 10 having on its inner perimeter a cutting edge 11, which cooperates with cutting edge 8 of the fixed cutting jaw 6, with the two cutting edges 8 and 11 passing each other while cutting, and the cutting jaws 6 and 10 being arranged in different parallel planes so that they move along each other during a cutting process. It is understood that a work piece 12 that is to be cut, for example a cable, is taken up in the space enclosed by the cutting edges 8 and 11 and then cut apart in the course of the cutting process.

The movable cutting jaw 10 has on its outer perimeter an outer toothing 13, which is formed and arranged in the shape of triangular toothing in the direction shown. On the movable hand lever 2 a thrust lever 14 is pivotally supported with the aid of a drag bearing 15. The thrust lever has teeth 16 on its free end, which are formed and intended to mesh with the outer toothing 13 of the movable cutting jaw 10. The teeth 16 are formed and arranged in such a way that they engage with the outer toothing 13 during a closing motion of the hand levers 1 and 2 and move the movable cutting jaw 10 by one tooth of the toothing 13 in the closing direction, while they slide back over the outer toothing 13 in a ratchet-like fashion during an opening motion of the hand levers 1 and 2. The thrust lever is pushed in the direction of the outer toothing 13 in a clockwise direction about its drag bearing 15 by a spring, not shown.

A notch lever 17 is pivotally supported on the bearing plate 7 with the aid of a drag bearing 18 in a limited pivotable way. The notch lever 17 has, similar to the thrust lever 14, teeth 19, which are formed and intended to mesh with the outer toothing 13. The notch lever 17, too, is pushed in a clockwise direction by a spring, not shown, so that its teeth 19 are held against the outer toothing 13. The arrangement and formation of the teeth 16 and 19 is equal with respect to one another. The bearing of the teeth 16 of the thrust lever 14 on the movable hand lever 2, and the bearing of the teeth 19 of the notch lever 17 on the fixed hand lever 1 results in a different action insofar as the teeth 19 keep the movable cutting jaw 10 from pivoting in a counterclockwise direction about the drag bearing 9 during the opening motion of the hand levers 1 and 2, while they allow the pivoting of the movable cutting jaw 10 about the drag bearing 9 in a pitch-step during the closing motion of the hand levers 1 and 2 towards each other.

Figure 2:
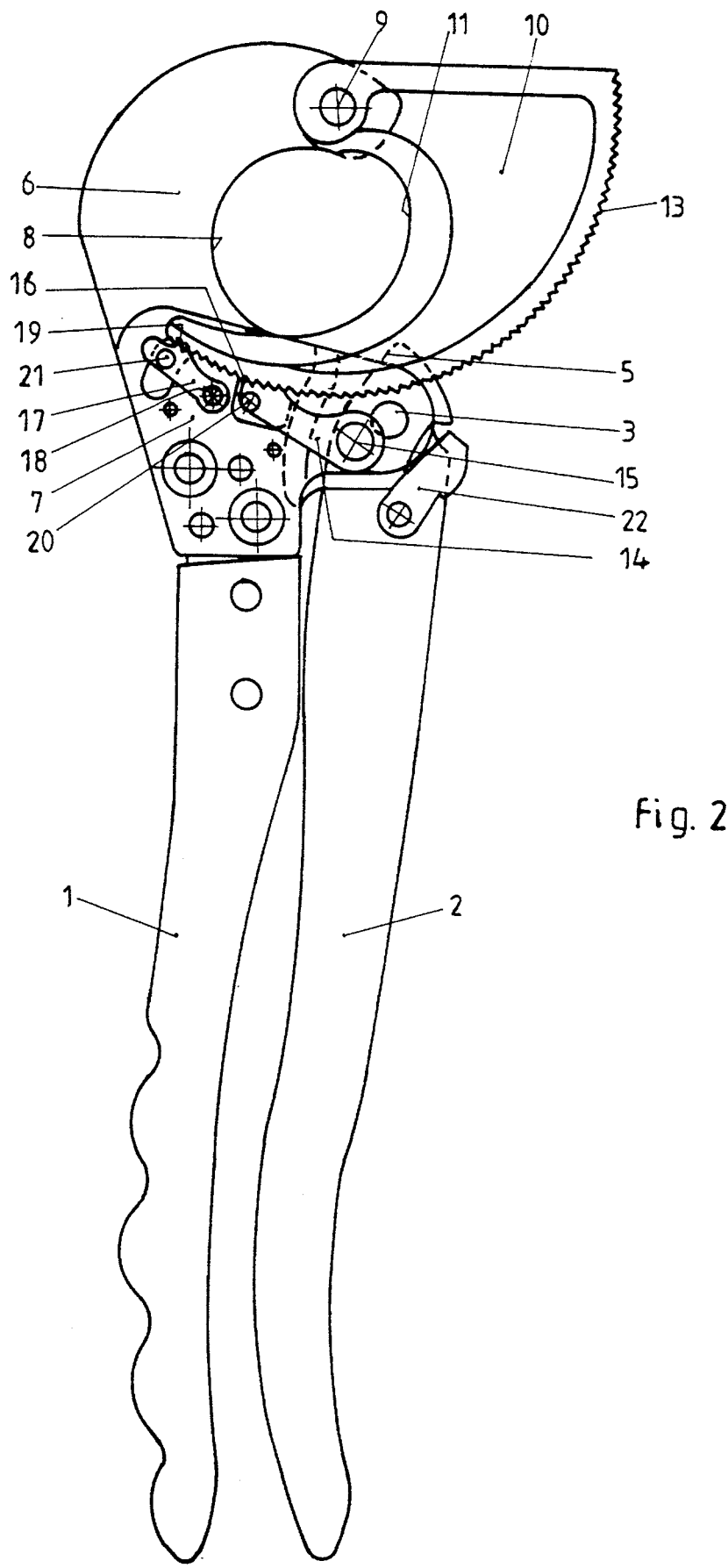
FIG. 2 a side view of the scissors in the closed position.

For the cutting of a work piece 12 the movable cutting jaw 10 is pivoted about the drag bearing 9 so that the outer toothing 13 has contact neither with thrust lever 14 nor with the notch lever 17. As shown in FIG. 1, the cutting edges 8 and 11 form an open-rimmed opening, through which the work piece 12, e.g. a relatively long cable, can be introduced. In order to set free the full movability of the cutting jaw 10, a pin 20 is provided on the thrust lever 14 and pin 21 is provided on the notch lever 17, which pass through openings in the bearing plate 7 and which allow a limited pivoting of the thrust lever 14 and the notch lever 17, so that their teeth 16 and 19 can be lifted off of the outer toothing 13 against spring pressure. For their mutual actuation an actuation plate, not shown here, can be provided on the outside of the bearing plate 7. After the work piece 12 has been put onto the cutting edge 8 of the fixed cutting jaw 6 the movable cutting jaw 10 is pivoted by hand in a clockwise direction about its drag bearing 9, until the outer toothing 13 comes into an effective contact with one of the first teeth 19 of the notch lever 17. This position is shown in FIG. 1. The cutting jaw 10 can also be pushed further, which causes the teeth 16 of the thrust lever 14 as well as the teeth 19 of the notch lever 17 to click past the outer toothing 13. This process is stopped when the work piece 12 is clamped between the cutting edges 8 and 11. Then the cutting process starts, which is carried out in a step-like fashion by alternately moving or swinging the hand levers 1 and 2 into an opened and a closed position. Such a swinging movement is called a step or a stroke. FIG. 1 shows the opened position, i.e. the start of a closing motion. FIG. 2 shows the corresponding closed position of this first stroke. It is seen that through the necessary number of closing and opening motions of the hand levers 1 and 2 following one another, the movable cutting jaw is continuously swung further in a clockwise direction by one tooth with respect to its pitch, until the work piece 12 is fully cut apart. From FIG. 5 a locking lever 22 is also seen, with which the hand levers 1 and 2 can be secured in an almost fully closed position for the transport of the scissors. It is understood that the locking lever 22 is opened during the cutting process.

Figure 3:
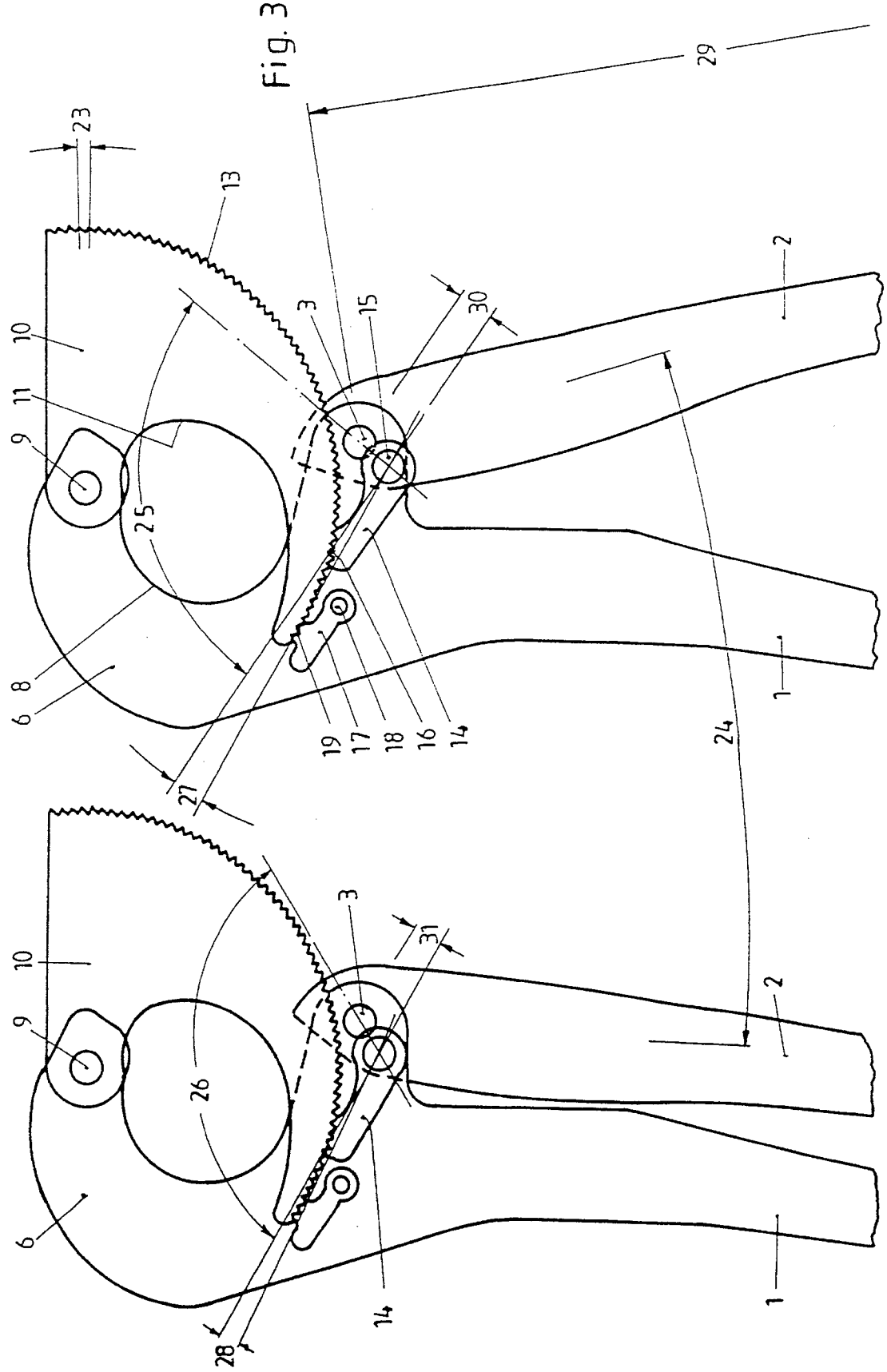
FIG. 3 a side by side illustration of the scissors in the opened and closed positions to clarify the initial and final knee angles, FIG. 4 an enlarged detail of the thrust lever and the notch lever in the opened position of the hand levers, FIG. 5 an enlarged detail of the thrust lever and the notch lever in the closed position of the hand levers, and FIG. 6 a plot of the force that has to be exerted against the number of the teeth in contact with a work piece.

FIG. 3 shows the opened and closed positions of the scissors in FIGS. 1 and 2 in a combined depiction and clarifies some features essential to the invention. Shown are scissors of a certain size, with which work pieces 12 of a corresponding diameter can be cut. In this embodiment the pitch is 23, so that the angle about the axis of the drag bearing 9 between two peaks of teeth of the outer toothing 13 following each other is 2.3°. This is a comparatively small pitch, which leads to the teeth of the toothing 13 to also become relatively small.

The maximum opening angle 24, the angle that the movable hand lever 2 encloses between its maximum opened position and its maximum closed position, is in this case favorably only 20°.

The thrust lever 14 has such a length, relative to the position of its teeth 16 with respect to its drag bearing 15, and relative to the position of its drag bearing 15 with respect to the drag bearing 3, that an initial knee lever angle 25 of 94.3° is formed. The initial knee lever angle 25 is already greater than 90°, and the beginning knee lever action of the knee lever drive comprised of the drag bearing 3, the hand lever 2, the drag bearing 15, and the thrust lever 14 with its teeth 16 is exploited already at the beginning of a closing motion of the hand levers 1 and 2 towards each other. This takes place during every work step of the cutting process. In the course of one work step the knee lever angle increases until a final knee lever angle of 119.0° is obtained. During each work step of the closing movement the highest force to be exerted by the hand on the hand levers 1 and 2 is needed from the middle to the end region. Only the starting region requires a somewhat smaller force due to the circumstances. The hand levers exploit a considerable knee lever action especially from their middle to their end position.

Due to the reactively long formation of the thrust lever 14 and the relative arrangement of its drag bearing 15 with respect to the drag bearing 3, not only are knee lever angles with an improved usable knee lever effect applied, but the force transferred from the thrust lever 14 to the outer toothing 13 of the movable cutting jaw 10 is also directed in a more favorable direction of action. The cutting moment about the drag bearing 9 that needs to be applied to the work piece during the cutting process by the cutting edges 8 and 11 results from the force of the thrust lever 14 that can be transferred, and the distance of the direction of action of this force about the drag bearing 9. This distance would be at a maximum if the force could be applied by the thrust lever 14 in a direction tangential to the toothing 13. By the formation of the thrust lever 14 and its relative positioning with respect to the cutting jaw 10 an initial force effect angle 27 of 5.1° is applied, i.e. the force effect direction of the force transferred by the thrust lever 14, that a connecting line extending between the drag bearing 15 and the teeth 16 deviates by only 5.1° from the tangential direction. Through the use of an initial knee lever angle 25 of 94.3°, and in any case larger than 90°, the drag bearing 15 on the hand lever 2 approaches the outer toothing 13 during the course of one work step so that the force effect angle decreases continually during one work step and terminates with a final force effect 28 angle of 1.7°. It is understood that this final force effect angle 28 is attained in the closed position of the hand levers 1 and 2 as shown in FIG. 2.

Through the choice of a relatively small pitch 23 of the outer toothing 13 it also becomes possible to improve the translation of the leverage condition. The force that can be exerted by hand on the hand levers 1 and 2 is applied in the embodiment of the scissors shown in FIG. 3 along a distance 29 of approximately 150 mm, so that the force acts on the hand levers 1 and 2 at a distance 29 from the drag bearing 3. In the starting position the drag bearings 3 and 15 are in such a relative position to each other that the effective initial lever distance 30 is approximately 6.9 mm. This effective lever distance decreases to a final lever distance 31 of 6.1 mm. This already results in an improvement of the first leverage translation to approximately 21.5 (150 mm: 6.9 mm). The small pitch also makes the reduction of the opening angle 24 to approximately 20° possible.

Figure 4:
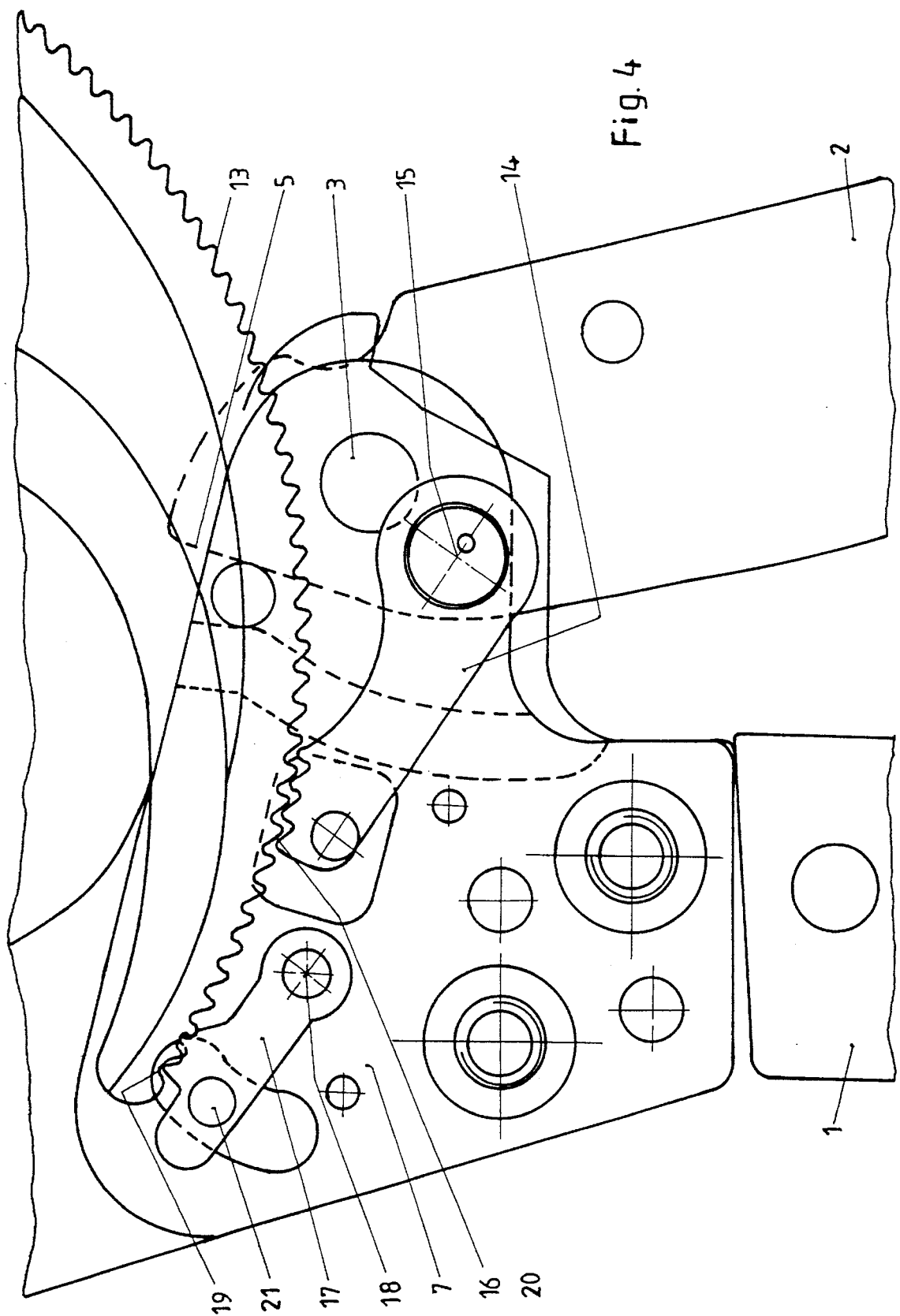
Figure 5:
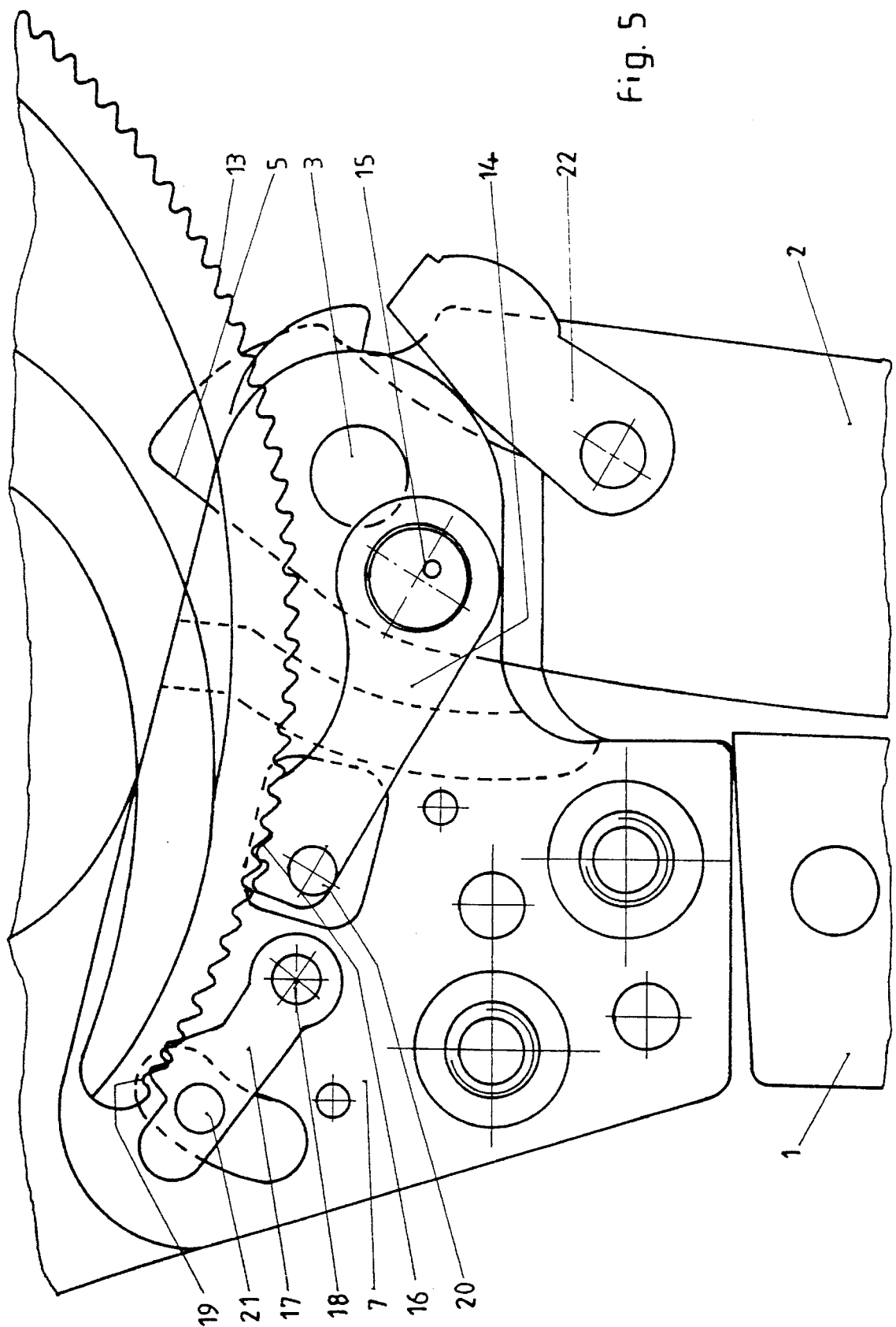

The FIGS. 4 and 5 show and clarify once more the interplay of the thrust lever 14, the notch lever 17, and the movable cutting jaw 10 during the actuation of the hand levers 1 and 2 in one work step. FIG. 4 corresponds to the position of the parts as they are shown in FIG. 1, while FIG. 5 corresponds to FIG. 2. It can be seen from the FIGS. 4 and 5 that the thrust lever 14 is provided with four teeth 16, which are arranged and formed so that at least two teeth 16 always mesh with the outer toothing 13. A roll off process takes place. The notch lever 17 has two teeth 19, both of which simultaneously contact the outer toothing 13 of the cutting jaw 10, so that the considerable spring force, which the work piece exerts on the cutting jaws 6 and 10, is securely taken up. The notch lever 17, too, extends in a generally tangential direction with respect to the outer toothing 13.

Figure 6:
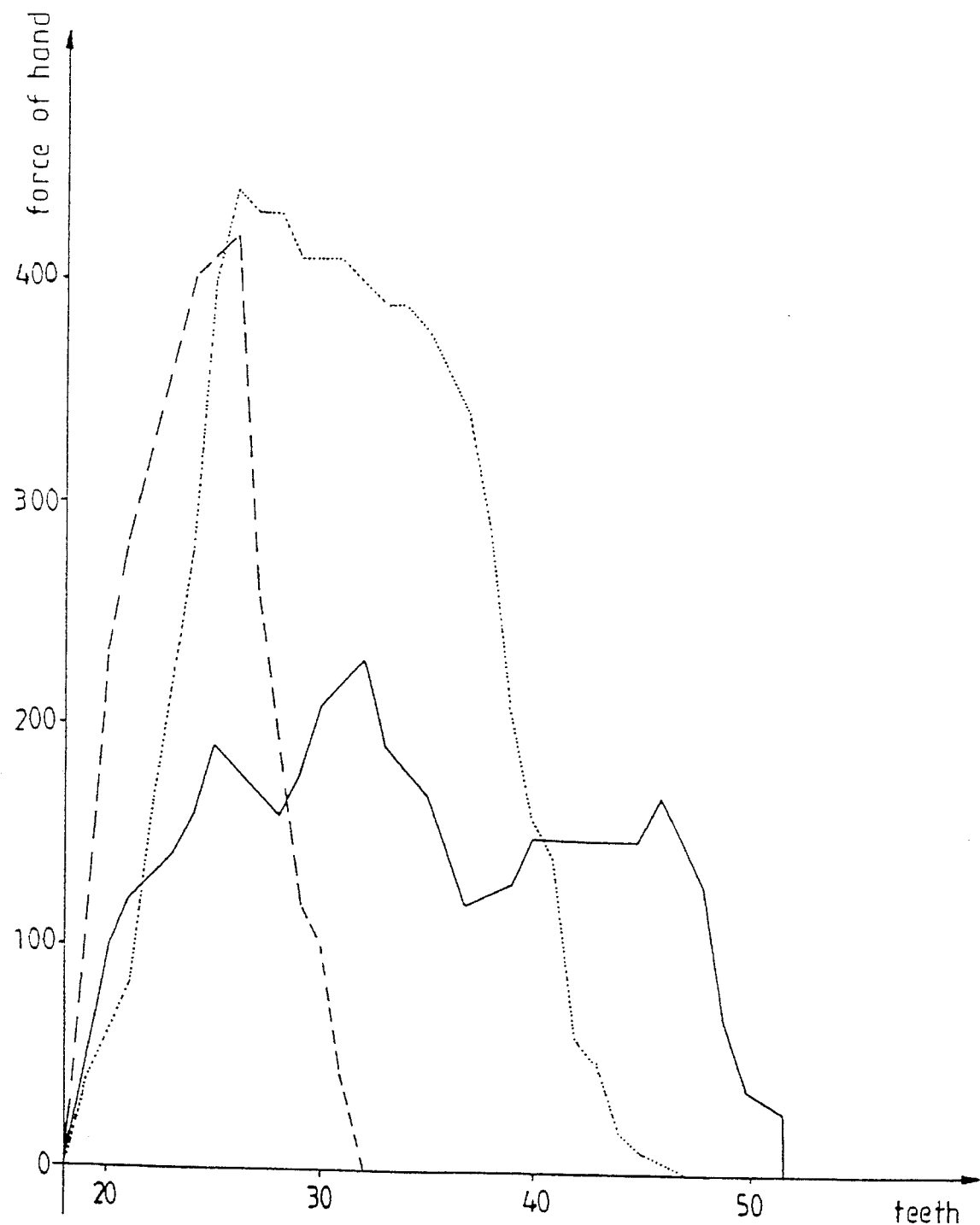

FIG. 6 shows a plot of the course of the maximum force of the hand during a cutting process, the progression of the number of work steps, with which the hand levers 1 and 2 have to be actuated. The dotted line is for scissors according to the state of the art. The dashed line shows the course of the force for generic scissors, and the solid line shows the course of the force for scissors according to the invention. The three scissors were used to cut the same work piece. It is seen that the cutting jaw 10 had to be swung to the 18th tooth before the cutting process started. Since the different scissors were formed somewhat differently the graphs of the hand force were shifted with respect to each other, so that all graphs start at the same point. It can be seen very clearly, though, that the scissors according to the state of the art require a hand force which is approximately twice as high as that of the invention, albeit the number of work steps that have to be carried out with the scissors according to the invention is comparatively high. The absolute height of the hand force, though, clearly shows that a two-handed operation of the scissors is necessary in the state of the art, while the scissors according to the invention allow a one-handed operation.

While the foregoing specification and drawings set forth a preferred embodiment of the invention, it will be understood by those skilled in the art that variations and modifications thereof can be made without departing from the spirit and scope of the invention as set forth in the following claims.

We claim:

1. A hand actuated scissors for cutting a work piece, including cables and branches, said scissors including a fixed hand lever and a pivotable hand lever, each of said levers having a handle at one end and a tool at its opposite end, first pivot pin means pivotally fastening said levers to one another, a fixed cutting jaw rigidly affixed at one of its ends to said fixed hand lever, a moveable cutting jaw pivotally mounted on said fixed cutting jaw, said moveable cutting jaw being adapted to be placed about a work piece and moved toward said fixed cutting jaw to encircle the work piece in said fixed and moveable cutting jaws, an outer toothing having a plurality of teeth formed along said moveable cutting jaw, a knee lever drive adapted to move the cutting jaws toward each other, said drive including a toothed thrust lever, second pivot pin means pivotally fastening said thrust lever to said pivotable hand lever, a toothed notch lever, and third pivot pin means pivotally fastening said notch lever to the fixed hand lever, said thrust lever and said notch lever being adapted to be alternatingly meshed with the teeth of the outer toothing so that the thrust lever moves in response to the movement of said pivotable hand lever with respect to said fixed hand lever and moves said moveable cutting jaw toward said fixed cutting jaw and the notch lever ratchets over the teeth of said outer toothing and holds the moveable cutting jaw in position with respect to the fixed cutting jaw, said scissors also having an open position in which the hand levers are at their greatest distance from one another, and a closed position in which the hand levers are closest to one another, wherein:

an initial knee lever angle of no less than ninety degrees is formed in the open position of the scissors, the knee lever angle being defined by a first line extending from said first pivot pin means, where the pivotable hand lever is pivotally fastened to the fixed hand lever, to said second pivot pin means, where the thrust lever is pivotally fastened to the pivotable hand lever, and by a second line extending from said second pivot pin means to the position in the center of where the teeth of the thrust lever mesh with the teeth of the outer toothing on said moveable cutting jaw; and the teeth of the outer toothing have a tooth pitch no greater than 2.3 degrees.

2. The scissors of claim 1, wherein the scissors have a final knee lever angle of approximately one hundred-twenty degrees in the closed position of the scissors.

3. The scissors of claim 1, comprising an initial force effect angle of no more than six degrees in the open position of the scissors, the force effect angle being an acute angle defined by a first line extending from said second pivot pin means to the position in the center of where the teeth of the thrust lever mesh with the teeth of the outer toothing, and a second line extending from said second pivot pin means to the position where the teeth of the notch lever mesh with the teeth of the outer toothing.

4. The scissors of claim 1, wherein said thrust lever has at least three teeth.

5. The scissors of claim 1, wherein said notch lever has at least two teeth, said teeth being adapted to act in a generally tangential direction with respect to and on the teeth of the outer toothing.

6. The scissors of claim 1, comprising an opening angle of approximately twenty degrees between the fixed hand lever and the pivotable hand lever of the scissors in the open position.

7. The scissors of claim 6, comprising a stop formed on the pivotable hand lever, said stop being sized and shaped to define said opening angle.

8. The scissors of claim 1, wherein each tooth of said outer toothing, said thrust lever, and said notch lever, respectively, is sized and shaped with a generally triangular tooth profile.

9. The scissors of claim 1, wherein said initial knee lever angle is ninety-four degrees.

10. A hand actuated scissors for cutting a work piece, including cables and branches, comprising:

a first elongated hand lever and a second elongated hand lever, said levers being pivotally fastened to one another;

a fixed cutting jaw rigidly affixed to one of the ends of the first hand lever;

a moveable cutting jaw pivotally mounted on said fixed cutting jaw, said moveable cutting jaw being adapted to be placed about the work piece and moved toward said fixed cutting jaw so that the fixed and moveable cutting jaws surround the work piece;

an outer toothing having a plurality of teeth formed along said moveable cutting jaw;

a knee lever drive adapted to move said cutting jaws toward each other, said knee lever drive including a toothed thrust lever pivotally fastened at one of its ends to the second hand lever and a toothed notch lever pivotally fastened at one of its ends to the first hand lever, the thrust lever and the notch lever being adapted to be alternatingly meshed with the teeth of the outer toothing of said moveable jaw so that the thrust lever moves the moveable cutting jaw toward the fixed cutting jaw and the notch lever ratchets over and holds the moveable cutting jaw in position with respect to the fixed cutting jaw;

wherein the scissors has an open position in which the hand levers are at their greatest distance from one another, and a closed position in which the hand levers are closest to one another;

said knee lever drive including a knee lever angle defined by a first line extending from a point where said second hand lever is pivotally fastened to said first hand lever to a point where said thrust lever is pivotally fastened to said second hand lever, and by a second line extending from the point where said thrust lever is pivotally fastened to said second hand lever to a point in the center of where the teeth of said thrust lever mesh with the teeth of said outer toothing on said moveable cutting jaw, and wherein said knee lever angle in the open position of the scissors is no less than ninety degrees; and wherein the teeth of said outer toothing have a tooth pitch no greater than 2.3 degrees.

11. The scissors of claim 10, wherein the scissors have a final knee lever angle of approximately one hundred-twenty degrees in the closed position of the scissors.

12. The scissors of claim 10, comprising an initial force effect angle of no more than six degrees in the open position of the scissors, the force effect angle being an acute angle defined by a first line extending from a point where said thrust lever is pivotally fastened to said second hand lever to a point in the center of where the teeth of said thrust lever mesh with the teeth of said outer toothing, and a second line extending from the point where said thrust lever is pivotally fastened to said second hand lever to a point where the teeth of the notch lever mesh with the teeth of the outer toothing 13. The scissors of claim 10, comprising an opening angle of approximately twenty degrees between the first hand lever and the second hand lever of the scissors in the open position.

14. The scissors of claim 10, wherein each tooth of said outer toothing, said thrust lever, and said notch lever, respectively, is sized and shaped with a generally triangular tooth profile.

15. The scissors of claim 10, wherein said initial knee lever angle is ninety-four degrees.

16. In a hand scissors for cutting a work piece, including cables and branches, the scissors including a first elongated hand lever and a second elongated hand lever pivotally fastened to one another, a fixed cutting jaw rigidly affixed at one of the ends of the first hand lever, a moveable cutting jaw pivotally mounted on the fixed cutting jaw, the moveable cutting jaw being adapted to be placed about the work piece and moved toward the fixed cutting jaw for surrounding the work piece, an outer toothing having a plurality of teeth formed along the moveable cutting jaw, a knee lever drive adapted to move the cutting jaws toward each other, the drive including a toothed thrust lever pivotally fastened at one of its ends to the second hand lever and a toothed notch lever pivotally fastened at one of its ends to the first hand lever, the thrust lever and the notch lever being adapted to be alternatingly meshed with the teeth of the outer toothing so that in response to the second hand lever being pivoted toward the first hand lever the thrust lever engages at least one tooth of the outer toothing and moves the moveable cutting jaw toward the fixed cutting jaw and into engagement with the work piece, and the notch lever ratchets over at least one tooth of the outer toothing and holds the moveable cutting jaw in position with respect to the fixed cutting jaw, the scissors having an open position in which the hand levers are at their greatest distance from one another, and a closed position in which the hand levers are closest to one another, the improvement comprising:

an initial knee lever angle of no less than ninety degrees in the open position of the scissors, and a final knee lever angle of approximately one hundred-twenty degrees in the closed position of the scissors, the knee lever angle being defined by a first line extending from a point where the second hand lever is pivotally fastened to the first hand lever to a point where the thrust lever is pivotally fastened to the second hand lever, and by a second line extending from the point where the thrust lever is pivotally fastened to the second hand lever to a point in the center of where the teeth of the thrust lever mesh with the teeth of the outer toothing on the moveable cutting jaw;

wherein the teeth of the outer toothing, the thrust lever, and the notch lever each have a generally triangular tooth profile; and wherein the teeth of the outer toothing have a tooth pitch no greater than 2.3 degrees.

17. The scissors of claim 16, comprising an initial force effect angle of no more than six degrees in the open position of the scissors, the force effect angle being an acute angle defined by a first line extending from the point where the thrust lever is pivotally fastened to the second hand lever to the point in the center of where the teeth of the thrust lever mesh with the teeth of the outer toothing, and a second line extending from the point where the thrust lever is pivotally fastened to the second hand lever to the point where the teeth of the notch lever mesh with the teeth of the outer toothing.

* * * * *